United States Patent
Matsuura et al.

(10) Patent No.: US 7,466,491 B2
(45) Date of Patent: Dec. 16, 2008

(54) DLC FILM AND METHOD FOR FORMING THE SAME

(75) Inventors: Takashi Matsuura, Itami (JP); Kazuhiko Oda, Itami (JP); Toshihiko Ushiro, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/660,036

(22) PCT Filed: Jul. 6, 2005

(86) PCT No.: PCT/JP2005/012446

§ 371 (c)(1),
(2), (4) Date: Feb. 12, 2007

(87) PCT Pub. No.: WO2006/025152

PCT Pub. Date: Mar. 9, 2006

(65) Prior Publication Data

US 2007/0242364 A1    Oct. 18, 2007

(30) Foreign Application Priority Data

Aug. 31, 2004  (JP)  .............................. 2004-252705

(51) Int. Cl.
*G02B 3/00* (2006.01)
(52) U.S. Cl. ...................... 359/654; 359/652
(58) Field of Classification Search ................ 359/642, 359/652–655
See application file for complete search history.

(56) References Cited

FOREIGN PATENT DOCUMENTS

EP   1 542 043 A1   6/2005
EP   1 574 883 A1   9/2005
EP   1 696 248 A1   8/2006

(Continued)

OTHER PUBLICATIONS

T. Sotoyama, "An Optical Material GRADIUMU Having a Refractive Index Distribution in the Direction of the Optical Axial," O plus E, New Technology Communication Co., Ltd., Mar. 1998, pp. 330-336.

(Continued)

*Primary Examiner*—William C Choi
(74) *Attorney, Agent, or Firm*—Venable LLP; Michael A. Sartori; Justine A. Gozzi

(57) ABSTRACT

The present invention provides a DLC film that functions as an optical element and that can easily be miniaturized or integrated, and a method for forming the DLC film. A DLC film that has a refractive index varying continuously in at least one width direction from the center O of the DLC film. More specifically, a DLC film in which the refractive index decreases continuously in at least one width direction from the center O of the DLC film, and thereby the DLC film functions as a convex lens. A DLC film in which the refractive index increases continuously in at least one width direction from the center of the DLC film, and thereby the DLC film functions as a concave lens. A DLC film that has a refractive index varying continuously in the thickness direction. In addition, a method for forming a DLC film, including irradiating the DLC film with an energy beam to change the refractive index of the DLC film continuously in at least one width direction from the center of the DLC film and/or the thickness direction.

9 Claims, 9 Drawing Sheets

FOREIGN PATENT DOCUMENTS

| | | |
|---|---|---|
| EP | 1 783 519 A1 | 5/2007 |
| JP | 54-109456 | 8/1979 |
| JP | 57-114101 A | 7/1982 |
| JP | 57-120901 A | 7/1982 |
| JP | 59-054631 A | 3/1984 |
| JP | 61-240201 A | 10/1986 |
| JP | 62-133403 A | 6/1987 |
| JP | 06-75105 A | 3/1994 |
| JP | 10-142411 A | 5/1998 |
| JP | 2001-159702 | 6/2001 |
| JP | 2001-281417 | 10/2001 |
| JP | 2004-163892 A | 6/2004 |
| JP | 2004-198454 A | 7/2004 |
| WO | WO 2004/027464 A1 | 4/2004 |
| WO | WO 2004/055560 A1 | 7/2004 |

OTHER PUBLICATIONS

A. Yoshiaki, "Gradient Index Lens," Optronics, No. 2, 2005, pp. 146-150.

Zhang, G.F., et al., "Studies on diamondlike carbon films for antireflection coatings of infrared optical materials," *J. Appl. Phys.*, Jul. 15, 1994, pp. 705-707, vol. 76, No. 2, American Institute of Physics.

DLC FILM AND METHOD FOR FORMING THE SAME

TECHNICAL FIELD

The present invention relates to a diamond-like carbon (DLC) film having a continuously varying refractive index, which can be used as an optical element. More particularly, the present invention relates to a DLC film having a continuously decreasing or increasing refractive index and thereby functioning as a convex lens or a concave lens.

BACKGROUND ART

In recent years, optical elements that have a refractive index decreasing or increasing continuously in a direction from the optical axis toward the periphery and thereby function as a convex lens or a concave lens have been proposed (see, for example, Patent Document 1 and Patent Document 2).

For example, Patent Document 2 discloses a lens having a radial refractive index distribution by replacing Na ions in a glass with Ag ions in a molten salt. However, because of limited processability, the minimum diameter of the lens is about 1 mm, and the maximum difference in the refractive index in the radial direction is about 0.1. The lens must therefore have a large thickness (for example, about 3 to 10 mm) to achieve a sufficient converging or diverging function. This prevents miniaturization or integration of the optical element.

A material having a refractive index varying in the direction of the optical axis rather than in the radial direction has been proposed. An optical element formed of the material and having a thickness decreasing or increasing continuously in a direction from the optical axis toward the periphery can reduce the converging or diverging aberration (see, for example, Patent Document 3 and Non-patent Document 1).

For example, in Non-patent Document 1, glass layers having different refractive indices are stacked and are heated to form a lens having a refractive index distribution of about 0.1 in the thickness direction. However, because of limited processability, the lens must have a large thickness (for example, about 1 to 10 mm). This prevents miniaturization or integration of the optical element.

Patent Document 1: Japanese Unexamined Patent Application Publication No. 54-109456.

Patent Document 2: Japanese Unexamined Patent Application Publication No. 2001-159702.

Patent Document 3: Japanese Unexamined Patent Application Publication No. 2001-281417.

Non-patent Document 1: TOYAMA Syoji, "KOJIKU HOUKOU BUNPU KUSSETURITU KOGAKU ZAIRYO GRADIUMU (An optical material GRADIUMU having a refractive index distribution in the direction of the optical axial)," O plus E, New Technology Communications Co., Ltd., March 1998, pp. 330-336.

DISCLOSURE OF INVENTION

Problems to be Solved by the Invention

It is an object of the present invention to provide a DLC film that functions as an optical element and that can easily be miniaturized or integrated. It is another object of the present invention to provide a method for forming the DLC film.

Means for Solving the Problems

The present invention provides a DLC film that has a refractive index varying continuously in at least one width direction from the center of the DLC film. The DLC film may have a refractive index decreasing continuously in at least one width direction from the center of the DLC film and thereby functions as a convex lens. The DLC film may have a refractive index increasing continuously in at least one width direction from the center of the DLC film and thereby functions as a concave lens.

The present invention provides a DLC film that has a refractive index varying continuously in the thickness direction. The DLC film may have a refractive index increasing continuously in the thickness direction. Furthermore, the DLC film may have a thickness decreasing continuously in at least one width direction from the center of the DLC film and thereby functions as a convex lens. Furthermore, the DLC film may have a thickness increasing continuously in at least one width direction from the center of the DLC film and thereby functions as a concave lens. Furthermore, the DLC film may have a refractive index decreasing continuously in at least one width direction from the center of the DLC film and thereby functions as a convex lens. The DLC film may have a refractive index increasing continuously in at least one width direction from the center of the DLC film and thereby functions as a concave lens.

In the DLC film that has a refractive index varying continuously in the thickness direction, the DLC film may include a plurality of concentric ring regions, ring zones may have different refractive indices to function as a diffraction grating, and the width of each of the ring regions may decrease with an increase in the distance from the center of the concentric ring regions. Furthermore, the DLC film may include m concentric ring zones, each of the ring zones may include n ring regions, an inner ring region may have a refractive index higher than that of an outer ring region in each of the ring zones, the corresponding ring regions of each ring zone may have the same refractive index, and the DLC film may function as a convex lens. Furthermore, the DLC film may include m concentric ring zones, each of the ring zones may include n ring regions, an inner ring region may have a refractive index lower than that of an outer ring region in each of the ring zones, the corresponding ring regions of each ring zone may have the same refractive index, and the DLC film may function as a concave lens.

The present invention provides a method for forming a DLC film. The method includes irradiating the DLC film with an energy beam to change the refractive index of the DLC film continuously in at least one width direction from the center of the DLC film and/or the thickness direction. In a method for forming a DLC film according to the present invention, the energy beam may be at least one beam selected from the group consisting of a light beam, an X-ray, an ion beam, and an electron beam.

Advantageous Effect of the Invention

As described above, the present invention can provide a DLC film that functions as an optical element and that can easily be miniaturized or integrated, and a method for forming the DLC film.

BRIEF DESCRIPTION OF THE DRAWINGS

FIG. 6C illustrates the DLC film after etching.

FIG. 7C illustrates the DLC film after etching.

EXPLANATION OF REFERENCED NUMERALS

Figure 1A:
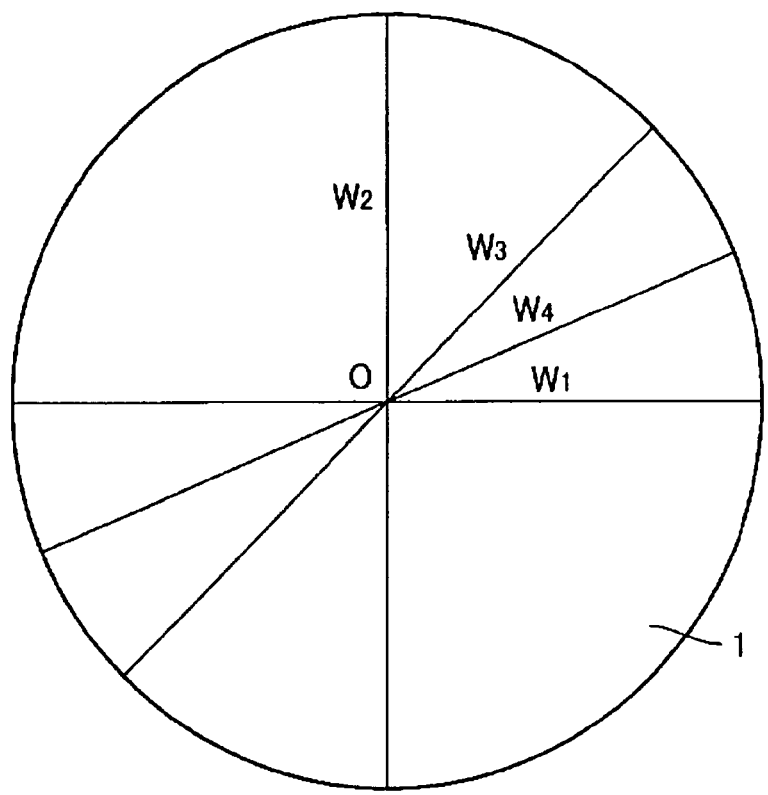
FIG. 1A is a schematic top view of a DLC film according to the present invention.

1, $1a$, $1b$, $1c$, $1e$, $1f$, $1p$, $1q$, $1v$, $1w$, $1x$, $1y$ DLC film
$1g$, $1h$ main face
$1j$ high-refractive-index region
$1k$ low-refractive-index region
$1s$ plane perpendicular to thickness direction
10 electroconductive layer
11 gold mask
12 strong He ion beam
13 weak He ion beam
$21a$, $21b$, $21d$, $21e$, 31 resist pattern
$O_2$ plasma
111 direction in which refractive index increases

BEST MODE FOR CARRYING OUT THE INVENTION

First, in the practice of the present invention, the present inventors observed that energy beam irradiation can increase the refractive index of a translucent DLC film. The DLC film can be formed on a substrate, such as a silicon substrate or a glass substrate, by plasma chemical vapor deposition (CVD). A DLC film formed by plasma CVD according to the present invention has a relatively low hardness (for example, Knoop hardness of less than 1000) and a relatively low refractive index (for example, about 1.55) and thus differs from existing DLC films (mainly used in tools), which have a relatively high hardness (for example, Knoop hardness of at least 2000) and a relatively high refractive index (for example, about 2.0).

An energy beam for increasing the refractive index of a DLC film according to the present invention may be an ion beam, an electron beam, a synchrotron radiation (SR) beam, or an ultraviolet (UV) beam. Among these energy beam irradiation, He ion irradiation was found to increase the maximum refractive index change $\Delta n$ of a DLC film to about 0.65. SR beam irradiation can also increase the maximum refractive index change An of a DLC film to about 0.50. Furthermore, UV beam irradiation can also increase the maximum refractive index change An of a DLC film to about 0.20. These refractive index changes of a DLC film by energy beam irradiation are much larger than the refractive index changes of existing glasses by ion exchange ($\Delta n=0.17$ at a maximum) or of quartz glasses by UV beam irradiation (up to about $\Delta n=0.01$).

With reference to FIGS. 1 and 2, a DLC film according to the present invention has a refractive index that varies in at least one width direction $W_1$ from the center O of the DLC film. The DLC film has a refractive index varying continuously in at least one width direction from the center of a film and thereby functions as an optical element. The following first to fourth embodiments further describe DLC films according to the present invention.

First Embodiment

Figure 1B:
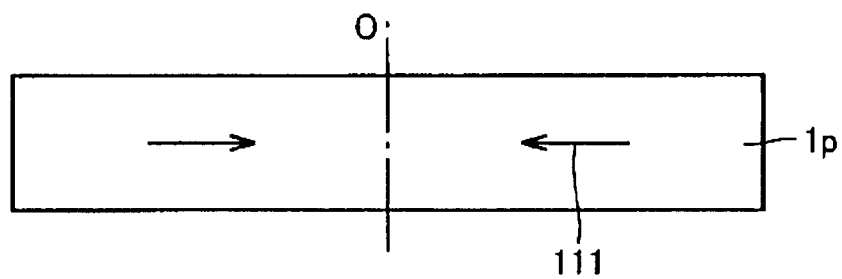
FIG. 1B is a schematic cross-sectional view of a DLC film according to the present invention.

With reference to FIGS. 1A and 1B, a DLC film according to the present embodiment has a refractive index decreasing continuously in at least one width direction $W_1$ from the center O of the DLC film (that is, in FIG. 1B, the direction 111 in which the refractive index increases points to the center O of the DLC film) and is a DLC film $1p$ functioning as a convex lens.

As illustrated in FIGS. 1A and 1B, the DLC film has a refractive index distribution in which the refractive index decreases continuously in not only one width direction $W_1$ but also any width direction $W_2$, $W_3$, $W_4$, or the like from the center O of the DLC film. In other words, the refractive index continuously decreases toward the periphery. Thus, the DLC film functions as a convex lens having a focal point on the axis passing through the center O of the DLC film. Preferably, to function as an excellent convex lens, the refractive index is designed to decrease toward the periphery in proportion to the square of the radius.

An exemplary method for forming the DLC film is described below. First, a DLC film 1 having a thickness of 2 μm is formed on a $SiO_2$ glass substrate by plasma CVD. The $SiO_2$ glass substrate has a main face having a diameter of 5 mm and has a refractive index of 1.44.

Figure 3A:
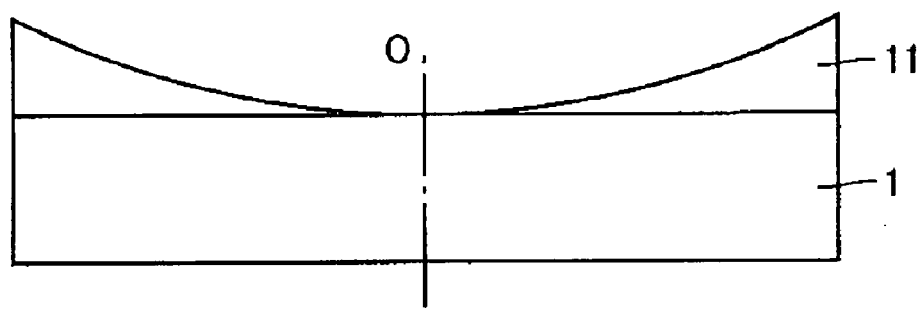
FIG. 3A is a schematic cross-sectional view illustrating a method for forming a DLC film that functions as a convex lens, according to the present invention. A gold mask is formed on the DLC film.

Second, with reference to FIG. 3A, a gold mask 11 is formed on the DLC film 1 by sputtering. A silicon stamping die (not shown) is then pressed against the gold mask 11. The silicon stamping die has a convex spherical surface formed by reactive ion etching (RIE). Thus, the thickness of the gold mask 11 is smallest at the center O of the DLC film 1 and increases in a direction from the center O of the DLC film 1 toward the periphery.

Figure 3B:
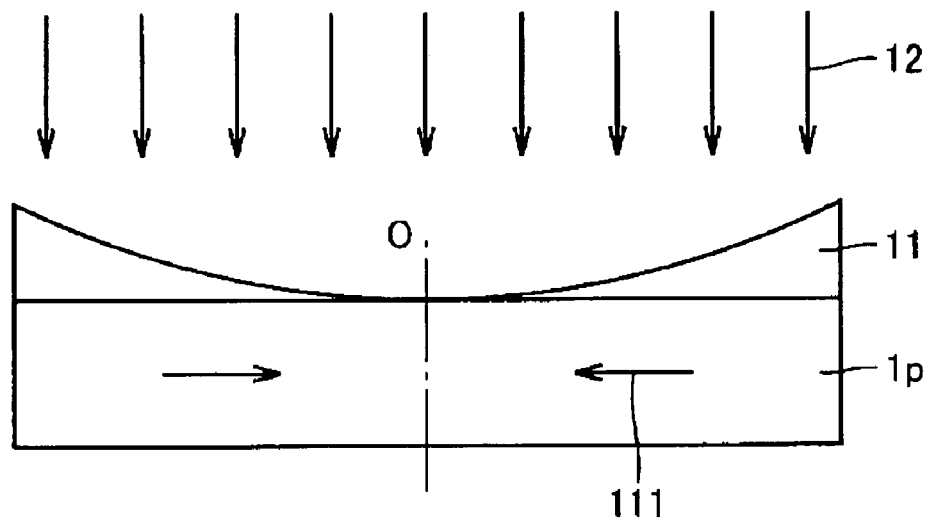
FIG. 3B is a schematic cross-sectional view illustrating a method for forming a DLC film that functions as a convex lens, according to the present invention. The DLC film is irradiated with a He ion beam from the gold mask side.

Third, with reference to FIG. 3B, a strong He ion beam 12 (accelerating voltage: 800 keV) is applied to the gold mask 11 perpendicularly to the DLC film. Then, the gold mask 11 is etched away to form a DLC film $1p$ functioning as a convex lens. The refractive index of the DLC film $1p$ decreases continuously in a direction from the center O of the DLC film toward the periphery (that is, in FIG. 3B, the direction 111 in which the refractive index increases points to the center O of the DLC film). The radial refractive index distribution was determined as follows: the hydrogen concentration in a DLC film was determined in the radial direction by secondary ion mass spectrometry (SIMS), and then the refractive index was calculated from the relationship between the hydrogen concentration in the DLC film and the refractive index.

When the thickness of the gold mask 11 formed on the DLC film increases in a direction from the center of the DLC film toward the periphery in proportion to the square of the radius, the refractive index of the DLC film can decrease in a direction from the center of the DLC film toward the periphery in proportion to the square of the radius. The DLC film thus formed can function as an excellent convex lens.

Second Embodiment

Figure 1C:
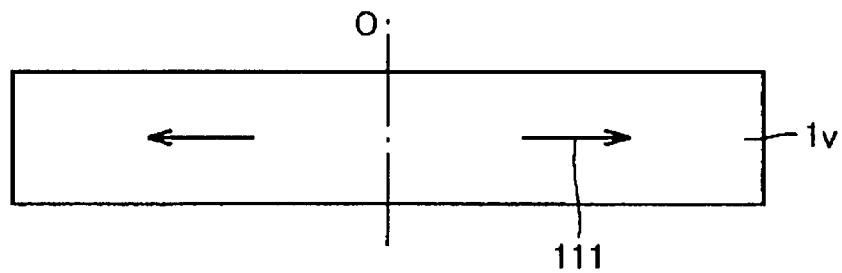
FIG. 1C is a schematic cross-sectional view of a DLC film according to the present invention.

With reference to FIGS. 1A and 1C, a DLC film according to the present embodiment has a refractive index increasing continuously in at least one width direction $W_1$ from the center O of the DLC film (that is, in FIG. 1C, the direction 111 in which the refractive index increases points to the periphery of the DLC film) and is a DLC film $1v$ functioning as a concave lens.

As illustrated in FIGS. 1A and 1C, the DLC film has a refractive index distribution in which the refractive index increases continuously in not only one width direction $W_1$ but also any width direction $W_2$, $W_3$, $W_4$, or the like from the center O of the DLC film. In other words, the refractive index continuously increases toward the periphery. Thus, the DLC film functions as a concave lens that diffuses light around the axis passing through the center O of the DLC film. Preferably, to function as an excellent concave lens, the refractive index is designed to increase toward the periphery in proportion to the square of the radius.

An exemplary method for forming the DLC film is described below. First, a DLC film 1 having a thickness of 2 μm is formed on a $SiO_2$ glass substrate by plasma CVD. The $SiO_2$ glass substrate has a main face having a diameter of 5 mm and has a refractive index of 1.44.

Figure 4A:
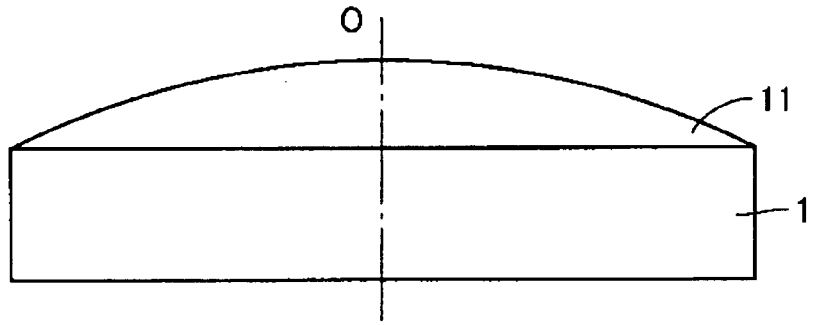
FIG. 4A is a schematic cross-sectional view illustrating a method for forming a DLC film that functions as a concave lens, according to the present invention. A gold mask is formed on the DLC film.

Second, with reference to FIG. 4A, a gold mask 11 is formed on the DLC film 1 by sputtering. A silicon stamping die (not shown) is then pressed against the gold mask 11. The silicon stamping die has a concave spherical surface formed by RIE. Thus, the thickness of the gold mask 11 is largest at the center O of the DLC film 1 and decreases in a direction from the center O of the DLC film 1 toward the periphery.

Figure 4B:
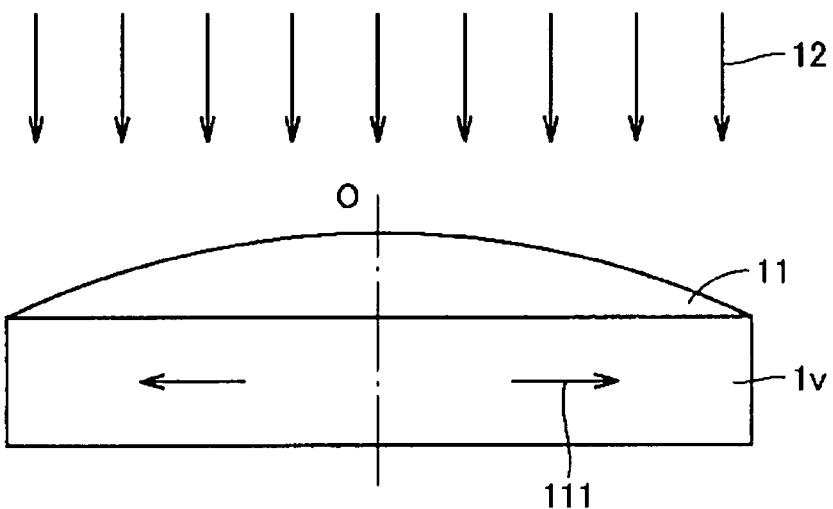
FIG. 4B is a schematic cross-sectional view illustrating a method for forming a DLC film that functions as a concave lens, according to the present invention. The DLC film is irradiated with a He ion beam from the gold mask side.

Third, with reference to FIG. 4B, a strong He ion beam 12 (accelerating voltage: 800 keV) is applied to the gold mask 11 perpendicularly to the DLC film. With reference to FIG. 4B, the gold mask 11 is then etched away to form a DLC film $1v$ functioning as a concave lens. The refractive index of the DLC film $1v$ increases continuously in a direction from the center O of the DLC film toward the periphery (that is, in FIG. 4B, the direction 111 in which the refractive index increases points to the periphery of the DLC film).

When the thickness of the gold mask formed on the DLC film decreases in a direction from the center of the DLC film toward the periphery in proportion to the square of the radius, the refractive index of the DLC film can increase in a direction from the center of the DLC film toward the periphery in proportion to the square of the radius. The DLC film thus formed can function as an excellent concave lens.

Third Embodiment

Figure 2A:
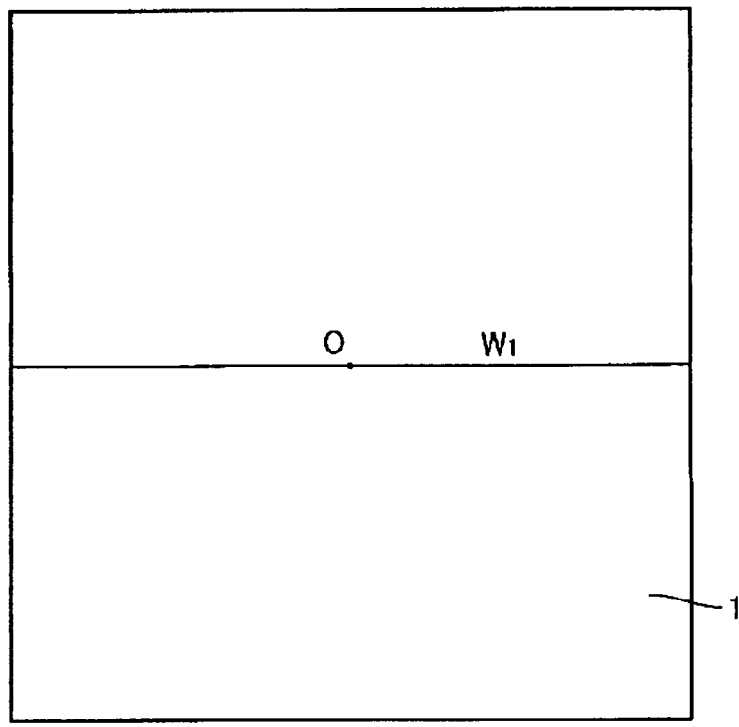
FIG. 2A is a schematic plan view of another DLC film according to the present invention.
Figure 2B:
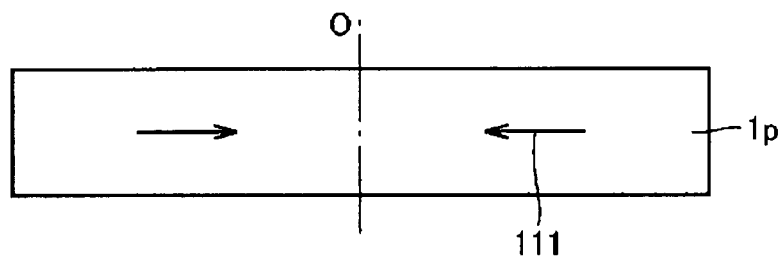
FIG. 2B is a schematic cross-sectional view of another DLC film according to the present invention.

With reference to FIGS. 2A and 2B, a DLC film according to the present embodiment has a refractive index decreasing continuously in at least one width direction $W_i$ from the center O of the DLC film (that is, in FIG. 2B, the direction 111 in which the refractive index increases points to the center of the DLC film) and is a DLC film $1p$ functioning as a convex lens.

As illustrated in FIGS. 2A and 2B, the DLC film has a refractive index distribution in which the refractive index decreases continuously in one width direction $W_1$ from the center O of the DLC film toward the periphery. Thus, the DLC film functions as a convex lens having a focal line in a width direction orthogonal to the width direction $W_1$ (cylindrical lens). Preferably, to function as an excellent convex lens, the refractive index is designed to decrease toward the periphery in proportion to the square of the width (distance from the center of the DLC film).

The DLC film can be prepared as in the first embodiment, except that the thickness of the gold mask is smallest at the center of the DLC film and increases in one width direction from the center toward the periphery.

Fourth Embodiment

Figure 2C:
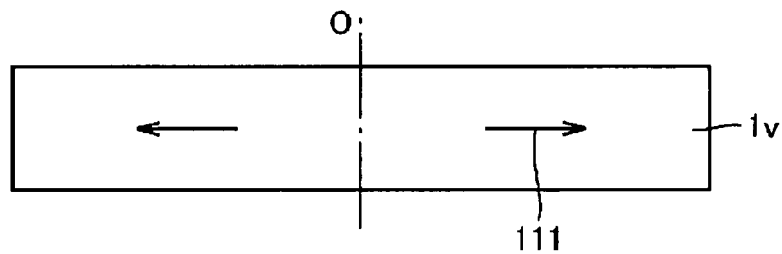
FIG. 2C is a schematic cross-sectional view of another DLC film according to the present invention.

With reference to FIGS. 2A and 2C, a DLC film according to the present embodiment has a refractive index increasing continuously in at least one width direction $W_1$ from the center O of the DLC film (that is, in FIG. 2C, the direction 111 in which the refractive index increases points to the periphery) and is a DLC film $1v$ functioning as a concave lens.

As illustrated in FIGS. 2A and 2C, the DLC film has a refractive index distribution in which the refractive index increases continuously in one width direction $W_1$ from the center O of the DLC film toward the periphery. Thus, the DLC film functions as a concave lens that diffuses light around a symmetry plane including a width direction orthogonal to the width direction $W_1$ (cylindrical lens). Preferably, to function as a suitable concave lens, the refractive index is designed to increase toward the periphery in proportion to the square of the width (distance from the center of the DLC film).

The DLC film can be prepared as in the first embodiment, except that the thickness of the gold mask is largest at the center of the DLC film and decreases in one width direction from the center toward the periphery.

Fifth Embodiment

Figure 5:
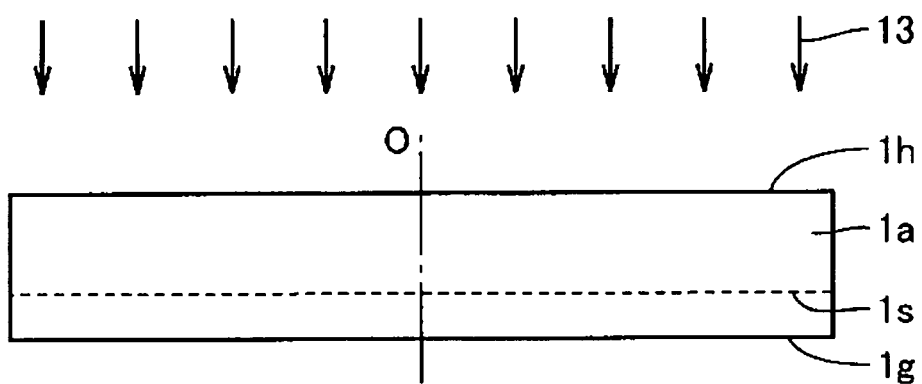
FIG. 5 is a schematic cross-sectional view illustrating a method for forming another DLC film according to the present invention.

With reference to FIG. 5, another DLC film according to the present invention is a DLC film 1a that has a refractive index varying continuously in the thickness direction. More specifically, the refractive index increases continuously in the thickness direction from a plane 1s, which is an inner surface or a surface of the DLC film and is perpendicular to the thickness direction of the DLC film, toward a main face 1h.

When the plane 1s perpendicular to the thickness direction of the DLC film corresponds to the other main face 1g of the DLC film, the refractive index increases continuously in the thickness direction from the other main face 1g toward the main face 1h of the DLC film. The DLC film that has a refractive index increasing continuously in the thickness direction is expected to function as an optical element for directing incident light in the direction in which the refractive index continuously increases to the thickness direction.

With reference to FIG. 5, in a DLC film having a refractive index increasing continuously in the thickness direction, when a weak He ion beam 13 (accelerating voltage: 100 keV) is applied to a main face 1h of the DLC film perpendicularly to the DLC film, He ions are injected from the main face 1h of the DLC film to a plane 1s perpendicular to the thickness direction (the distance between the main face 1h and the plane 1s perpendicular to the thickness direction is 2 μm). The dose amount of He ions decreases continuously in the thickness direction from the main face 1h toward the plane is perpendicular to the thickness direction. A DLC film 1a thus formed therefore has a refractive index increasing continuously in the thickness direction from the plane 1s perpendicular to the thickness direction toward the main face 1h. The refractive index distribution in the thickness direction was determined as follows: the hydrogen concentration in a DLC film was determined in the thickness direction by SIMS, and then the refractive index was calculated from the relationship between the hydrogen concentration in the DLC film and the refractive index.

The following sixth to tenth embodiments further describe other DLC films according to the present invention.

Sixth Embodiment

Figure 6A:
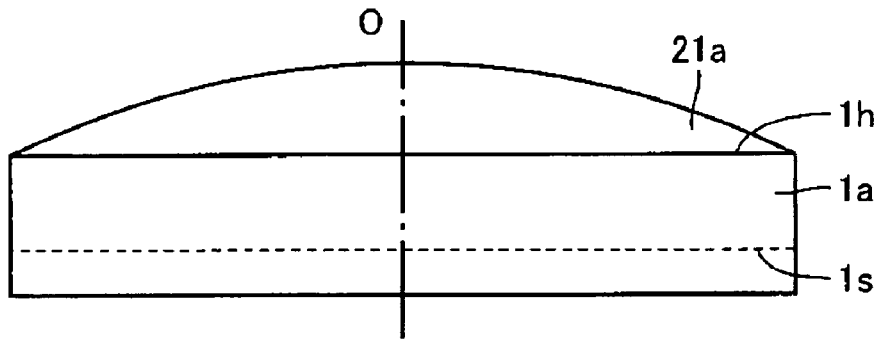
FIG. 6A is a schematic cross-sectional view illustrating a method for forming another DLC film that functions as a convex lens, according to the present invention. A resist pattern is formed on the DLC film.
Figure 6B:
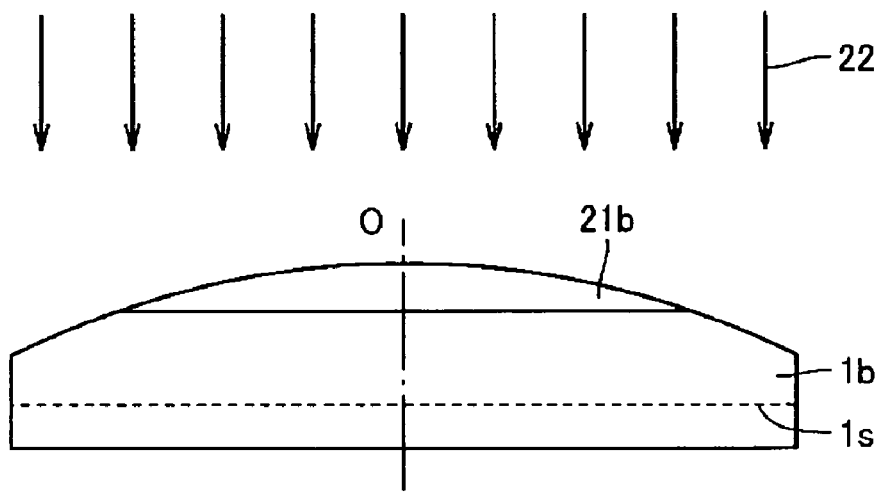
FIG. 6B is a schematic cross-sectional view illustrating a method for forming another DLC film that functions as a convex lens, according to the present invention. The DLC film and a resist pattern are being etched.
Figure 6C:
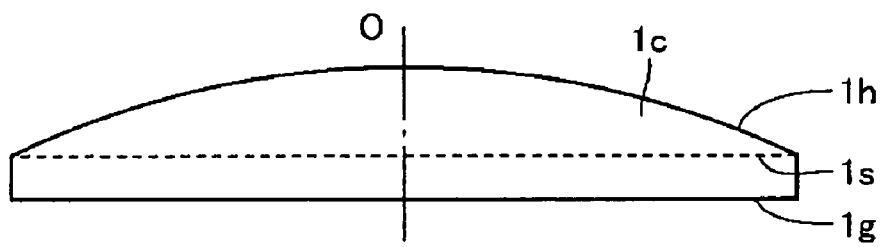
FIG. 6C is a schematic cross-sectional view illustrating a method for forming another DLC film that functions as a convex lens, according to the present invention.

With reference to FIG. 6C, in a DLC film according to the present embodiment, the refractive index increases continuously in the thickness direction from a plane is perpendicular to the thickness direction to a main face 1h of the DLC film, and the film thickness decreases continuously in at least one width direction from the center of the DLC film. A DLC film 1c thus formed functions as a convex lens.

When the film thickness decreases continuously in one width direction from the center O of the DLC film, the DLC film 1c functions as a convex lens having a focal line (cylindrical lens). When the film thickness decreases continuously in any width direction, that is, radially from the center O of the DLC film, the DLC film 1c functions as a convex lens having a focal point.

Furthermore, when the convex lens has a refractive index increasing continuously in the thickness direction to make the optical axis coincide with the thickness direction, incident light in the direction in which the refractive index continuously increases converges on the optical axis into collimated light. The convex lens therefore has a reduced converging aberration.

An exemplary method for forming the DLC film is described below. First, with reference to FIG. 6A, a resist pattern 21a is formed on a main face 1h of the DLC film 1a according to the fifth embodiment (a DLC film having a refractive index increasing continuously in the thickness direction from the plane 1s perpendicular to the thickness direction to the main face 1h of the DLC film). The thickness of the resist pattern 21a is largest at the center of the DLC film 1a and decreases in any width direction (radial direction) from the center toward the periphery. More specifically, a resist is applied to the main face 1h of the DLC film 1a with a spin coater. After the resist is semi-cured, a silicon stamping die having a concave spherical surface formed by RIE (not shown) is pressed against the semi-cured resist. Then, the semi-cured resist is fully cured. The thickness of the resist pattern 21a thus formed is largest at the center O of the DLC film 1a and decreases in a direction from the center toward the periphery.

Second, with reference to FIG. 6B, the resist pattern 21a and the DLC film 1a are etched with $O_2$ plasma 22. A DLC film 1b is etched while the outer diameter of a resist pattern 21b decreases. With reference to FIG. 6C, in a DLC film 1c thus formed, the refractive index increases continuously in the thickness direction from the plane 1s perpendicular to the thickness direction to the main face 1h of the DLC film, and the film thickness decreases continuously in any width direction (radial direction) from the center of the DLC film. Thus, the DLC film 1c functions as a convex lens. The ratio of the etching rate of the resist pattern 21b to the etching rate of the DLC film 1b can be changed to control the difference in film thickness between the center and the periphery of the DLC film 1c.

Seventh Embodiment

Figure 7A:
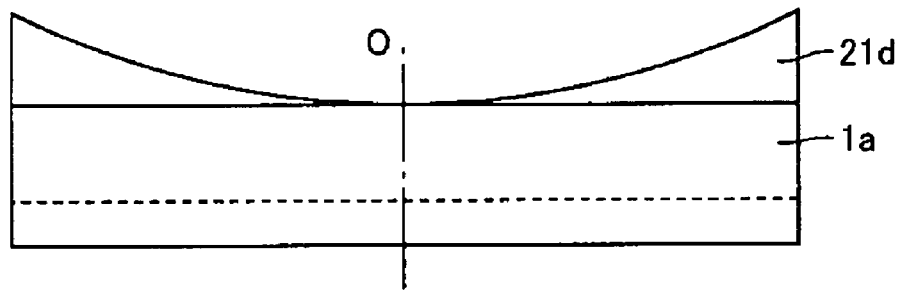
FIG. 7A is a schematic cross-sectional view illustrating a method for forming another DLC film that functions as a concave lens, according to the present invention. A resist pattern is formed on the DLC film.
Figure 7B:
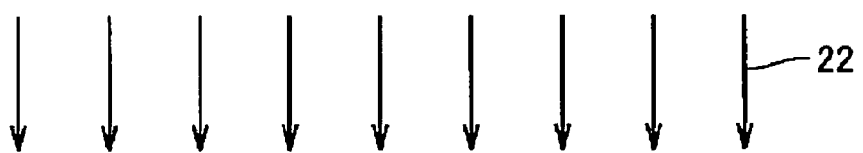
FIG. 7B is a schematic cross-sectional view illustrating a method for forming another DLC film that functions as a concave lens, according to the present invention. The DLC film and a resist pattern are being etched.
Figure 7B:
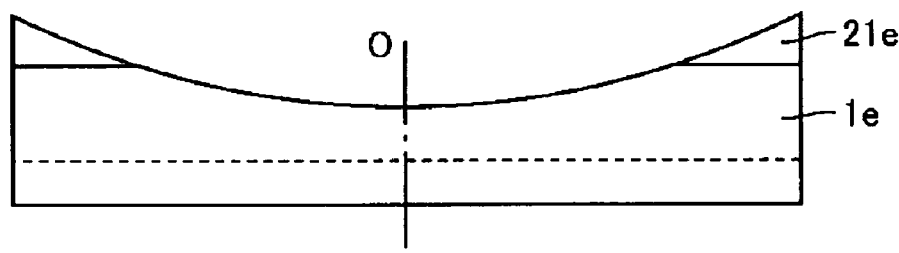
Figure 7C:
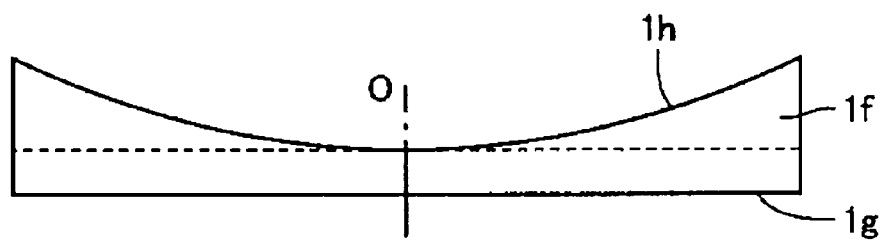
FIG. 7C is a schematic cross-sectional view illustrating a method for forming another DLC film that functions as a concave lens, according to the present invention.

With reference to FIG. 7C, in a DLC film according to the present embodiment, the refractive index increases continuously in the thickness direction from a plane 1s perpendicular to the thickness direction to a main face 1h of the DLC film, and the film thickness increases continuously in at least one width direction from the center of the DLC film. A DLC film 1f thus formed functions as a concave lens.

When the film thickness increases continuously in one width direction from the center O of the DLC film, the DLC film 1f functions as a concave lens that diffuses light around a symmetry plane including a width direction orthogonal to the one width direction (cylindrical lens). When the film thickness increases continuously in any width direction, that is, radially from the center O of the DLC film, the DLC film 1f functions as a concave lens that diffuses light around the axis passing through the center O of the DLC film.

Furthermore, when the concave lens has a refractive index increasing continuously in the thickness direction to make the optical axis coincide with the thickness direction, incident light in the direction in which the refractive index continuously increases is converted into light parallel to the optical axis. The concave lens therefore has a reduced diverging aberration.

An exemplary method for forming the DLC film is described below. First, with reference to FIG. 7A, a resist pattern 21d is formed on a main face 1h of the DLC film 1a according to the fifth embodiment (a DLC film having a refractive index increasing continuously in the thickness direction from the plane 1s perpendicular to the thickness direction to the main face 1h of the DLC film). The thickness of the resist pattern 21d is smallest at the center of the DLC film 1a and increases in any width direction (radial direction) from the center toward the periphery. More specifically, a resist is applied to the main face 1h of the DLC film 1a with a spin coater. After the resist is semi-cured, a silicon stamping die having a convex spherical surface formed by RIE (not shown) is pressed against the semi-cured resist. Then, the semi-cured resist is fully cured. The thickness of the resist pattern 21d thus formed is smallest at the center O of the DLC film 1a and increases in a direction from the center toward the periphery.

Second, with reference to FIG. 7B, the resist pattern 21d and the DLC film 1a are etched with $O_2$ plasma 22. A DLC film 1e is etched while the inner diameter of a resist pattern 21e increases. With reference to FIG. 7C, in a DLC film 1f thus formed, the refractive index increases continuously in the thickness direction from the plane 1s perpendicular to the thickness direction to the main face 1h of the DLC film, and the film thickness increases continuously in any width direction (radial direction) from the center of the DLC film. Thus, the DLC film 1f functions as a concave lens. The ratio of the etching rate of the resist pattern 21e to the etching rate of the DLC film 1e can be changed to control the difference in film thickness between the center and the periphery of the DLC film 1f.

Eighth Embodiment

Figure 8:
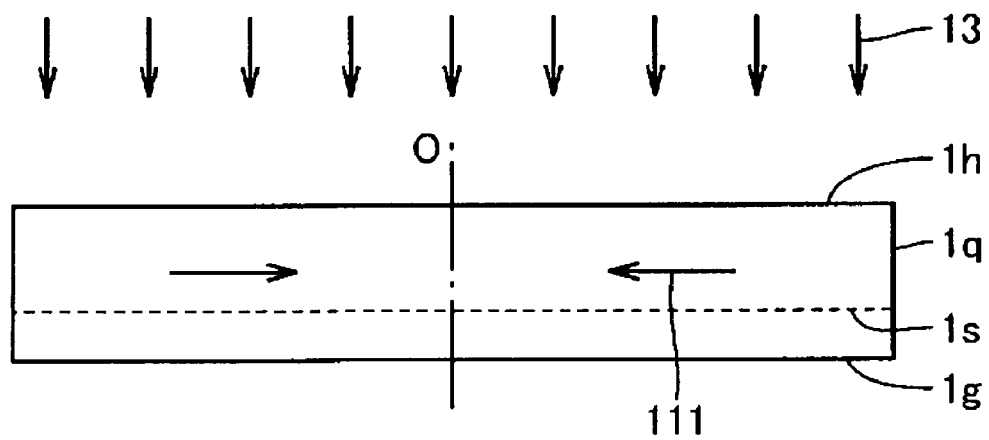
FIG. 8 is a schematic cross-sectional view illustrating another method for forming another DLC film that functions as a convex lens, according to the present invention.

With reference to FIG. 8, in a DLC film according to the present embodiment, the refraction index increases continuously in the thickness direction from a plane 1s perpendicular to the thickness direction to a main face 1h of the DLC film, and the refractive index decreases continuously in at least one width direction from the center of the DLC film (that is, the direction 111 in which the refractive index increases points to the center O of the DLC film in FIG. 8). A DLC film 1q thus formed functions as a convex lens.

When the refractive index decreases continuously in one width direction from the center O of the DLC film, the DLC film 1q functions as a convex lens having a focal line (cylindrical lens). When the refractive index decreases continuously in any width direction, that is, radially from the center O of the DLC film, the DLC film 1q functions as a convex lens having a focal point.

Furthermore, when the convex lens has a refractive index increasing continuously in the thickness direction to make the optical axis coincide with the thickness direction, incident light in the direction in which the refractive index continuously increases converges on the optical axis into collimated light. The convex lens therefore has a reduced converging aberration.

An exemplary method for forming the DLC film is described below. First, with reference to FIGS. 3 and 8, a strong He ion beam 12 (accelerating voltage: 800 keV) is applied to a predetermined gold mask 11 formed on the DLC film. A DLC film 1p thus formed has a refractive index decreasing continuously in a direction from the center O toward the periphery and thereby functions as a convex lens.

Second, when a weak He ion beam 13 (accelerating voltage: 100 keV) is applied to a main face 1h of the DLC film 1p perpendicularly to the DLC film, the dose amount of He ions decreases continuously in the thickness direction from the main face 1h toward the plane 1s perpendicular to the thickness direction (the distance between the main face 1h and the plane 1s perpendicular to the thickness direction is 1 μm). In a DLC film 1q thus formed, therefore, the refractive index decreases continuously in a direction from the center O toward the periphery, and the refractive index increases continuously in the thickness direction from the plane 1s perpendicular to the thickness direction of the DLC film toward the main face 1h.

When a strong energy beam is used to form a refractive index distribution in which the refractive index decreases continuously in a direction from the center O toward the periphery, and then a weaker energy beam is used to form a refractive index distribution in which the refractive index increases continuously in the thickness direction, a DLC film thus formed has both refractive index distributions. When this order is reversed, a stronger energy beam undesirably destroys a refractive index distribution formed by a weak energy beam.

Ninth Embodiment

Figure 9:
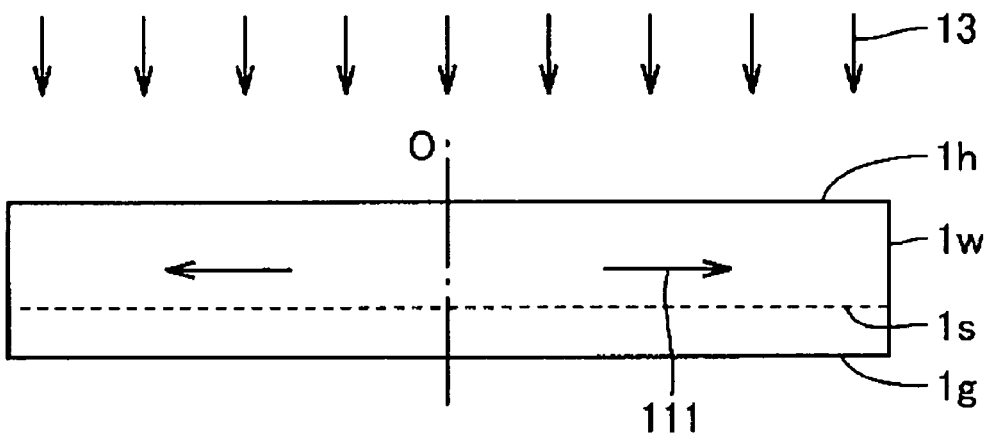
FIG. 9 is a schematic cross-sectional view illustrating another method for forming another DLC film that functions as a concave lens, according to the present invention.

With reference to FIG. 9, in a DLC film according to the present embodiment, the refraction increases continuously in the thickness direction from a plane 1s perpendicular to the thickness direction to a main face 1h of the DLC film, and the refractive index increases continuously in at least one width direction from the center of the DLC film (that is, the direction 111 in which the refractive index increases points to the periphery in FIG. 9). A DLC film 1w thus formed functions as a concave lens.

When the refractive index increases continuously in one width direction from the center O of the DLC film, the DLC film 1w functions as a concave lens that diffuses light around a symmetry plane including a width direction orthogonal to the one width direction (cylindrical lens). When the refractive index increases continuously in any width direction, that is, radially from the center O of the DLC film, the DLC film 1w functions as a concave lens that diffuses light around the axis passing through the center O of the DLC film.

Furthermore, when the concave lens has a refractive index increasing continuously in the thickness direction to make the optical axis coincide with the thickness direction, incident light in the direction in which the refractive index continuously increases is converted into light parallel to the optical axis. The concave lens therefore has a reduced diverging aberration.

An exemplary method for forming the DLC film is described below. First, with reference to FIGS. 4 and 9, a strong He ion beam 12 (accelerating voltage: 800 keV) is applied to a predetermined gold mask 11 formed on the DLC film. A DLC film 1v thus formed has a refractive index increasing continuously in a direction from the center O toward the periphery and thereby functions as a concave lens.

Second, when a weak He ion beam 13 (accelerating voltage: 100 keV) is applied to a main face 1h of the DLC film 1v perpendicularly to the DLC film, the dose amount of He ions decreases continuously in the thickness direction from the main face 1h toward the plane 1s perpendicular to the thickness direction (the distance between the main face 1h and the plane 1s perpendicular to the thickness direction is 1 μm). In a DLC film 1w thus formed, therefore, the refractive index increases continuously in a direction from the center O toward the periphery, and the refractive index increases continuously in the thickness direction from the plane 1s perpendicular to the thickness direction of the DLC film toward the main face 1h.

As in the eighth embodiment, a strong energy beam is necessary to form a refractive index distribution in which the refractive index increases continuously in a direction from the center O toward the periphery, and then a weaker energy beam is necessary to form a refractive index distribution in which the refractive index increases continuously in the thickness direction.

Figure 10A:
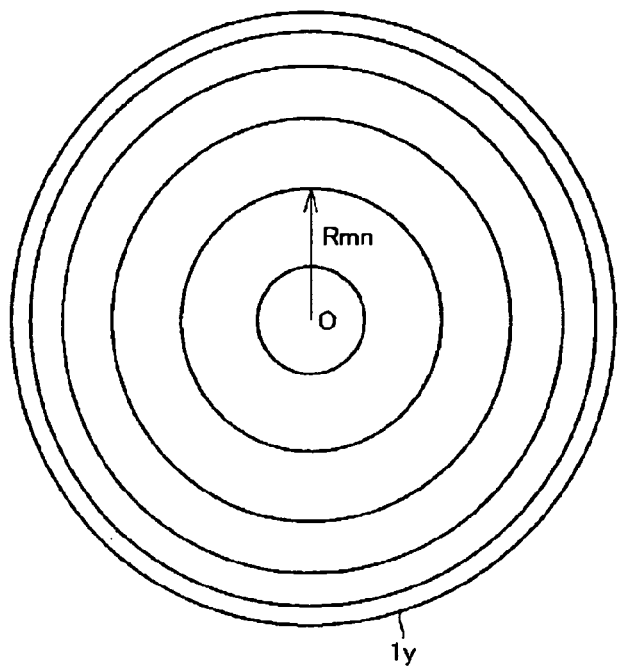
FIG. 10A is a schematic plan view of still another DLC film according to the present invention.
Figure 10B:
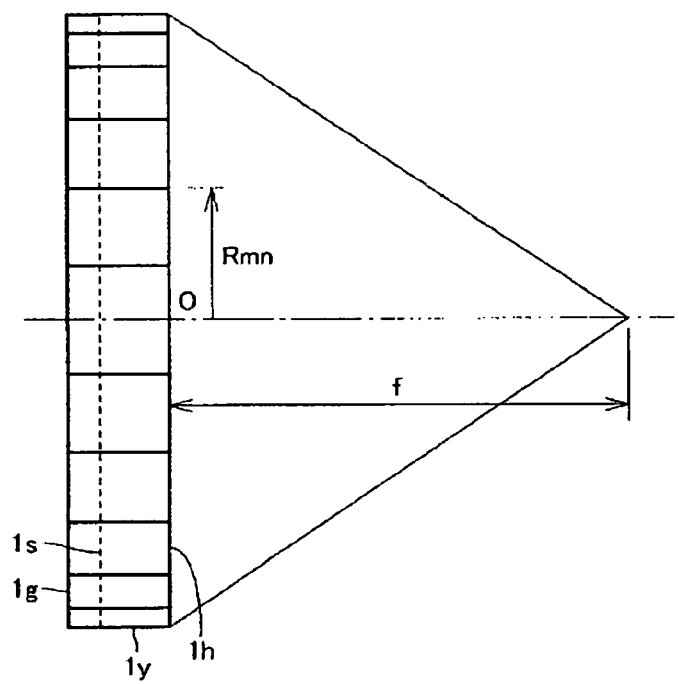
FIG. 10B is a schematic cross-sectional view of still another DLC film according to the present invention.

With reference to FIG. 10, in a still another DLC film 1y according to the present invention, the refractive index increases in the thickness direction from a plane 1s perpendicular to the thickness direction to a main face 1h. The DLC film 1y includes a plurality of concentric ring regions. Ring zones have different refractive indices to function as a diffraction grating. The width of each of the ring regions decreases with an increase in the distance from the center of the concentric ring regions. The following tenth to eleventh embodiments further describe still other DLC films according to the present invention.

Tenth Embodiment

With reference to FIG. 10, in a DLC film 1y according to the present embodiment, the refractive index increases continuously in the thickness direction from a plane 1s perpendicular to the thickness direction to a main face 1h of the DLC film. The DLC film 1y includes m concentric ring zones. Each of the ring zones includes n ring regions Rm1-Rmn. An inner ring region has a refractive index higher than that of an outer ring region in each of the ring zones. The corresponding ring regions of each ring zone have the same refractive index. Thus, the DLC film 1y functions as a convex lens.

In a ring region Rmn, when the refractive index of an inner ring region is higher than the refractive index of an outer ring region, the DLC film 1y functions as a convex lens having a focal point due to the diffraction of light.

Furthermore, when the convex lens has a refractive index increasing continuously in the thickness direction to make the optical axis coincide with the thickness direction, incident light in the direction in which the refractive index continuously increases converges on the optical axis into collimated light. The convex lens therefore has a reduced converging aberration.

With reference to FIG. 10, the DLC film 1y includes a plurality of concentric ring regions Rmn. The reference numeral Rmn denotes an n-th ring region in an m-th ring zone and also denotes a radius from the center of the concentric ring regions to the circumference of the ring region. The width of the ring region Rmn decreases with an increase in the distance from the center of the concentric ring regions.

Neighboring ring regions Rmn and Rm(n+1) have different refractive indices. When the DLC film 1y functioning as a convex lens illustrated in FIG. 10 is a diffraction film of two levels, the DLC film 1y contains up to three ring zones (m32 3) including up to two ring regions (n=2). In each ring zone, the refractive index of an inner ring region is higher than that of an outer ring region.

By analogy, in a diffraction film of four levels, one ring zone includes up to four ring regions (n=4). In each ring zone, the refractive index increases as a ring region approaches the center of the concentric ring regions. In other words, one ring zone includes four different refractive indices from the inner circumference to the outer circumference. Such four different refractive indices are repeated m times in the m ring zones.

The radius of the outer circumference of the ring region Rmn can be determined by the following Eq. (1) according to a diffraction theory including a scalar approximation. In Eq. (1), L denotes the diffraction level of a lens, λ denotes the wavelength of light, and f denotes the focal length of the lens. A maximum refractive index change Δn must yield a maximum phase modulation amplitude Δφ=2π(L−1)/L.

[Eq. 1]

$$Rmn = \sqrt{\frac{2mnf\lambda}{L} + \left(\frac{mn\lambda}{L}\right)^2} \quad (1)$$

Figure 11A:
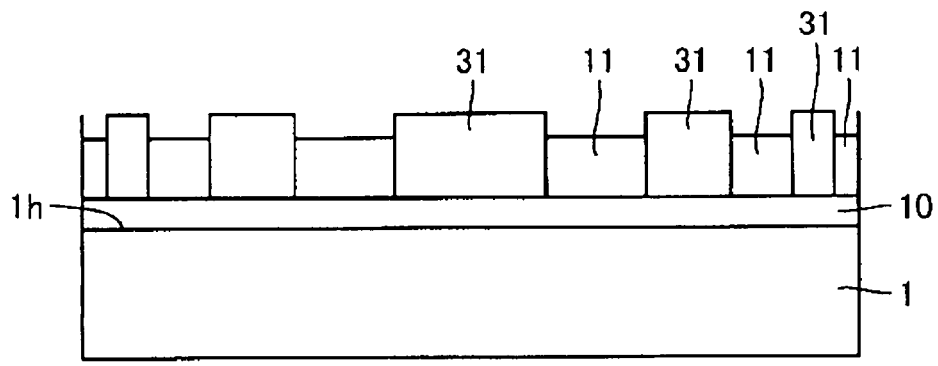
FIG. 11A is a schematic cross-sectional view illustrating a method for forming still another DLC film according to the present invention. A gold mask and a resist pattern are formed on the DLC film.

An exemplary method for forming the DLC film 1y is described below. First, with reference to FIG. 11A, for example, an electroconductive Ni layer 10 is formed on a main face 1h of a DLC film 1 by common electron beam (EB) vapor deposition. A resist pattern 31 is formed on the electroconductive Ni layer 10 to cover ring regions Rmn (n=1, m=1 to 3) in FIG. 10. A gold mask 11 is formed in the openings of the resist pattern 31 by electroplating.

Figure 11B:
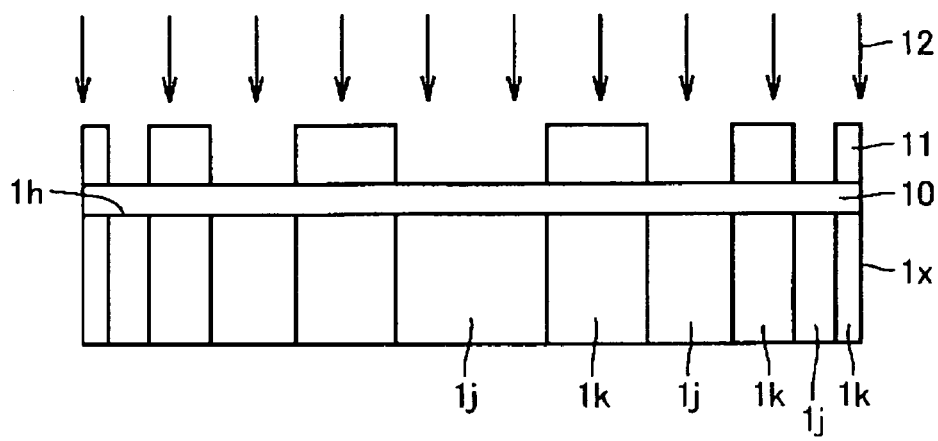
FIG. 11B is a schematic cross-sectional view illustrating a method for forming still another DLC film according to the present invention. The DLC film is irradiated with a strong He ion beam from the gold mask side.

Second, with reference to FIG. 11B, the resist pattern 31 is removed to leave the gold mask 11. The DLC film 1 is irradiated with a strong He ion beam 12 (accelerating voltage: 800 keV) through the openings of the gold mask 11. Thus, ring regions Rm1 irradiated with the He ion beam 12 have an increased refractive index to form high-refractive-index regions 1j. Ring regions Rm2 on which the He ion beam 12 is masked retain an initial refractive index of the DLC film 1 to form low-refractive-index regions 1k. Thus, as illustrated in FIG. 11B, a DLC film 1x thus formed includes diffraction regions of two levels.

In the example illustrated in FIG. 11, a mask layer is formed on each individual DLC film. It goes without saying that a DLC film may be irradiated with a He ion beam using a separately manufactured mask. It will be understood that a DLC film may repeatedly be irradiated with a He ion beam using a mask having a sequentially adjusted pattern to form a multilevel grating lens.

Furthermore, a gold mask on a DLC film may be impressed with a stamping die including concentric ring regions having multiple thicknesses. Then, the DLC film may be irradiated with a He ion beam ion through the impressed gold mask to produce a multilevel diffraction film at one time.

It will be understood that while a diffraction DLC film that functions as a convex lens having a focal point is described above, the present invention may also be applied to a diffraction DLC film that functions as a convex lens having a focal line. In the latter case, a plurality of concentric ring regions having different refractive indices may be replaced by a plurality of parallel belt-shaped regions having different refractive indices. In this case, for example, in the cross-sectional view of FIG. 10B, a plurality of parallel belt-shaped regions having different refractive indices extends perpendicularly to the drawing. Furthermore, the gold mask 11 in FIG. 11B may also extend perpendicularly to the drawing.

Figure 11C:
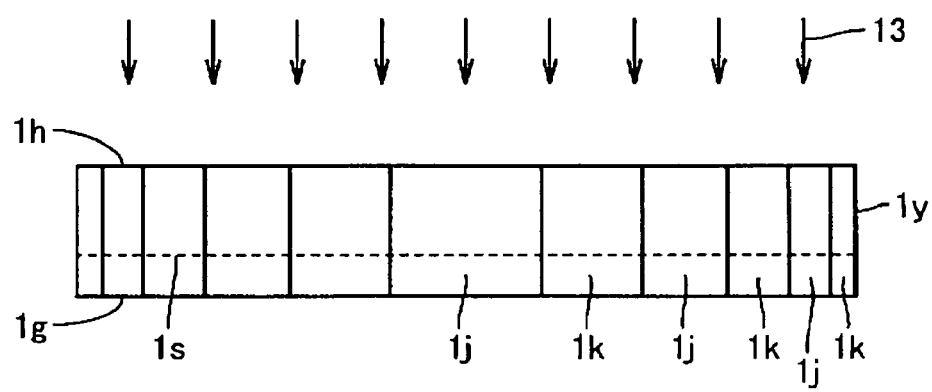
FIG. 11C is a schematic cross-sectional view illustrating a method for forming still another DLC film according to the present invention. The DLC film is irradiated with a weak He ion beam from the main face side.

Third, with reference to FIG. 11C, the main face 1h of the DLC film 1x, from which the gold mask 11 is etched away, is irradiated with a weak He ion beam 13 (accelerating voltage: 100 keV) perpendicularly to the DLC film. The dose amount of He ions decreases continuously in the thickness direction from the main face 1h of the DLC film toward a plane 1s perpendicular to the thickness direction (the distance between the main face 1h and the plane 1s perpendicular to the thickness direction is 1 μm). Thus, the refractive index increases continuously in the thickness direction from the plane 1s perpendicular to the thickness direction of the DLC film toward the main face 1h. The DLC film 1y thus formed includes a plurality of ring regions in which the refractive index in an inner ring region is higher than the refractive index of an outer ring region, and thereby functions as a convex lens. Because the refractive index increases continuously in the thickness direction, the DLC film 1y has a reduced converging aberration.

Eleventh Embodiment

With reference to FIG. 10, in a DLC film according to the present embodiment, the refractive index increases continuously in the thickness direction from a plane 1s perpendicular to the thickness direction to a main face 1h of the DLC film. The DLC film includes m concentric ring zones. Each of the ring zones includes n ring regions Rmn. An inner ring region has a refractive index lower than that of an outer ring region in each of the ring zones. The corresponding ring regions of each ring zone have the same refractive index. Thus, the DLC film functions as a concave lens.

In a ring region Rmn, when the refractive index of an inner ring region is lower than the refractive index of an outer ring region, the DLC film functions as a concave lens that diffuses light around the axis passing through the center O of the DLC film due to the diffraction of light.

Furthermore, when the concave lens has a refractive index increasing continuously in the thickness direction to make the optical axis coincide with the thickness direction, incident light in the direction in which the refractive index continuously increases is converted into light parallel to the optical axis. The concave lens therefore has a reduced diverging aberration.

The DLC film may be formed as in the tenth embodiment, except that the refractive index in an inner ring region is lower than the refractive index of an outer ring region in each ring zone.

It is to be understood that the embodiments disclosed herein are illustrated by way of example and not by way of limitation in all respects. The scope of the present invention is defined by the appended claims rather than by the description preceding them. All changes that fall within the scope of the claims and the equivalence thereof are therefore intended to be embraced by the claims.

The invention claimed is:

1. A DLC film that has a refractive index varying continuously in at least one width direction from the center of the DLC film, wherein the refractive index decreases continuously in at least one width direction from the center of the DLC film, and thereby the DLC film functions as a convex lens.

2. A DLC film that has a refractive index varying continuously in at least one width direction from the center of the DLC film, wherein the refractive index increases continuously in at least one width direction from the center of the DLC film, and thereby the DLC film functions as a concave lens.

3. A DLC film that has a refractive index varying continuously in the thickness direction, wherein the film thickness decreases continuously in at least one width direction from the center of the DLC film, and thereby the DLC film functions as a convex lens.

4. A DLC film that has a refractive index varying continuously in the thickness direction, wherein the film thickness increases continuously in at least one width direction from the center of the DLC film, and thereby the DLC film functions as a concave lens.

5. A DLC film that has a refractive index varying continuously in the thickness direction, wherein the refractive index decreases continuously in at least one width direction from the center of the DLC film, and thereby the DLC film functions as a convex lens.

6. A DLC film that has a refractive index varying continuously in the thickness direction, wherein the refractive index increases continuously in at least one width direction from the center of the DLC film, and thereby the DLC film functions as a concave lens.

7. A DLC film that has a refractive index varying continuously in the thickness direction, wherein the DLC film comprises a plurality of concentric ring regions, ring zones have different refractive indices to function as a diffraction grating, and the width of each of the ring regions decreases with an increase in the distance from the center of the concentric ring regions.

8. The DLC film according to claim 7, wherein the DLC film comprises m concentric ring zones, each of the ring zones comprises n ring regions, an inner ring region has a refractive index higher than that of an outer ring region in each of the ring zones, the corresponding ring regions of each ring zone have the same refractive index, and the DLC film functions as a convex lens.

9. The DLC film according to claim 7, wherein the DLC film comprises m concentric ring zones, each of the ring zones comprises n ring regions, an inner ring region has a refractive index lower than that of an outer ring region in each of the ring zones, the corresponding ring regions of each ring zone have the same refractive index, and the DLC film functions as a concave lens.

* * * * *